United States Patent

[11] 3,588,757

[72] Inventors Ernst Andrascek;
Erich Rosshaupter, Munich, Germany

[21] Appl. No. 766,513
[22] Filed Oct. 10, 1968
[45] Patented June 28, 1971
[73] Assignee Siemens Aktiengesellschaft
Berlin and Munich, Germany
[32] Priority Oct. 12, 1967
[33] Germany
[31] P 15 91 581.8

[54] MICROWAVE FILTER UTILIZING MULTIPLATE TECHNIQUE IN WHICH DIELECTRIC COATINGS ARE APPLIED TO METAL PLATES

7 Claims, 2 Drawing Figs.

[52] U.S. Cl. .......... 333/73, 333/84, 317/101
[51] Int. Cl. .......... H03h 7/10, H01p 3/00
[50] Field of Search .......... 333/73 (S), 73, 84 (M); 317/101 (CP), 101 (CM)

[56] References Cited

UNITED STATES PATENTS

| | | | |
|---|---|---|---|
| 2,915,716 | 12/1959 | Hattersley | 333/73(S) |
| 2,922,968 | 1/1960 | Van Patten | 333/73(S) |
| 3,287,540 | 11/1966 | Connelly | 29/492X |
| 3,327,255 | 6/1967 | Bolljahn et al. | 333/73 |
| 3,345,589 | 10/1967 | Di Piazza | 333/73 |
| 3,448,384 | 6/1969 | Scott | 333/73X |

OTHER REFERENCES

" Circuit Board Finishes," REFERENCE DATA FOR RADIO ENGINEERS, 5th Edition, page 5— 34

*Primary Examiner*—Herman Karl Saalbach
*Assistant Examiner*—Tim Vezeau
*Attorney*—Hill, Sherman, Meroni, Gross and Simpson

ABSTRACT: A microwave circuit employing multiplate technique in which two plates of dielectric material each carry on one side thereof a continuous metal layer and on the other side conductor tracks forming microwave circuit elements, with such plates being superimposed with their sides carrying such conductor tracks in opposed relation, and compression forces applied thereto, characterized by the dielectric being in the form of a relatively thin coating on one side of respective relatively thick metal plates and the conductor tracks being disposed the outer face of the respective dielectric coatings, the respective plates and associated dielectric coatings having perforations extending therethrough, the walls of the apertures being coated with a metallic layer extending from selected conductor tracks to the associated metal plate to conductively connect the same.

INVENTORS
Ernst Andrascek
Erich Rosshaupter

BY Hill, Sherman, Meroni, Gross & Simpson
ATTYS.

MICROWAVE FILTER UTILIZING MULTIPLATE TECHNIQUE IN WHICH DIELECTRIC COATINGS ARE APPLIED TO METAL PLATES

BACKGROUND OF THE INVENTION

The invention is directed to a microwave circuit of the type embodying the so-called multiplate technique, in which two plates of dielectric material each carry a continuous metal coating on one side thereof and are provided on the other side thereof with desired conductor strips or tracks which are to form microwave circuit elements, the two plates being superposed with the surfaces thereof carrying the respective conductor tracks being in opposed relation and compression forces externally applied to the assembly by suitable equipment.

Such technique is employed, in particular, for the fabrication of microwave circuits because of the ultimate savings in both weight and bulk. In actual practice, the two plates or panels are superimposed with the surfaces thereof carrying the conductor tracks in opposed relation, and compression forces applied thereto, for example by means of screws or the like, with such forces being applied to suitable external metal plates between which the microwave structure is disposed. The metal plates and the metal coatings of the dielectric plates in direct contact therewith are thereby employed as a reference surface for ground potential. Frequently circuit considerations require that the metal plates and coatings at ground potential be additionally connected to certain points of the conductor tracks.

SUMMARY OF THE INVENTION

The invention relates to the problem of further perfection of microwave circuits, generally utilizing the multiplate technique, with respect to simplification of construction and improvement in the operating dependability and efficiency thereof as well as a simplification in the production of such structures. Proceeding from a microwave circuit involving the multiplate technique referred to, the problem of the invention is solved by utilizing as dielectric plates, dielectric coatings which are applied to metal plates, as for example plates of aluminum, the outer surface of the dielectric layers having applied thereto the desired conductor tracks or strips, with the desired ground connections from the conductor tracks to the metal plate being effected by the provision of a plurality of perforations which extend through the metal plate and dielectric layer. To the surfaces defining such apertures is applied a metallized conductive coating, thereby effecting a conductive connection through the dielectric layer between the conductor tracks and the ground plate. When employing plates of aluminum the walls of the perforations preferably are initially coated with an intermediate layer of a material which possesses good adhesive characteristics with respect to the materials involved, following which a layer of copper may be electroplated followed by a chemical metallizing process and subsequent electroplated reinforcement.

In a particular advantageous embodiment of the invention the coatings and the perforations and the conductor tracks may be provided with a metallic protective layer.

BRIEF DESCRIPTION OF THE DRAWINGS

In the drawings wherein like reference characters indicate like or corresponding parts.

DESCRIPTION OF THE INVENTION

Permanently disposed on the upper surface of a metal plate 1, preferably of aluminum, is a coating 2 of a dielectric material, for example, suitable plastics of the type commonly employed in connection with miniature capacitors and the like, such dielectric coating carrying on its exposed face suitable circuitry in the form of conductor strips or tracks 3. In the particular embodiment illustrated, such tracks or strips form the conductor sections of an interdigital filter with the respective conductor sections suitably designed as to length to provide a desired resonance, thus forming filter resonators, which resonators are suitably interconnected and grounded.

Figure 1A:
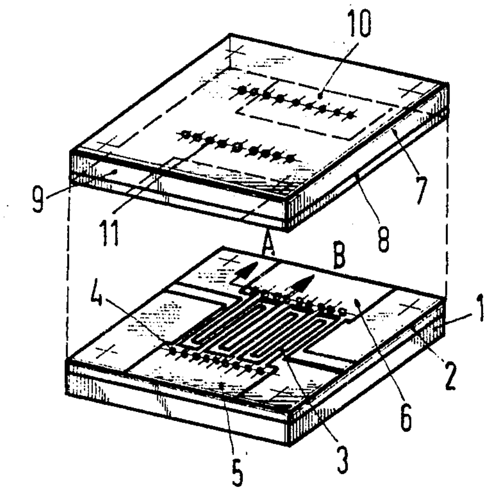
FIG. 1*a* is a perspective view of a filter structure embodying the multiplate technique, with the respective plates being shown in spaced relation to illustrate the details thereof.
Figure 1B:
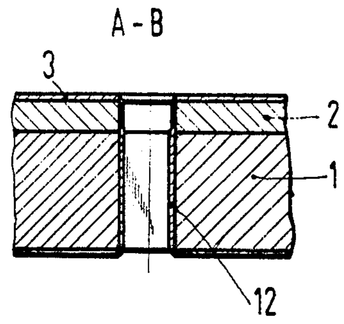
FIG. 1*b* is a sectional view through the lower plate illustrated in FIG. 1*a* taken approximately on the line A–B of FIG. 1*a*.

The ground connections from the conductor tracks 3 to the metal plate 1 is accomplished by means of a plurality of perforations extending through the plate 1 and dielectric 2 with the actual conductive connecting elements 4 being in the form of metallized coatings disposed upon the walls of the respective perforations, those in the embodiment of the invention illustrated being disposed along additional conductor tracks 5 and 6 which interconnect respective ends of the resonators. The other half of the filter structure comprises a metal plate 7, likewise preferably made of aluminum and carrying on one surface a similar coating 8 of dielectric material, which in turn carries highly conductive contacting strips, illustrated in broken lines in FIG. 1*a*, which in turn are similarly connected to the metal plates 7 by like metallized perforations. The two metal plates may be superimposed with the surfaces carrying the conductor tracks or strips in opposed relation and this assembly placed under compression by the aid of suitable force supplying means.

The electrical connection between the conductor track and the metal plate, which are permanently connected with the dielectric material may present a special problem as the metal plate usually consists of aluminum and the conductor tracks or strips of copper. As is known, aluminum and its alloys react very actively in acids and alkalis whereby they cannot be directly plated with conductive precipitations possessing good adhesive characteristics, such as copper. This problem is solved in the invention by precoating the walls of the respective perforations with a suitable chemical compound which will provide an intermediate layer 12 having good adhesive characteristics and subsequently effecting the contacting operations previously described. A very efficient material for this purpose may be selected, for example, from a class consisting of zincate, nickel or stannate and subsequently applying a copper coating thereto. This may then be followed by a chemical metallization of known type and subsequent reinforcement of the coatings in the perforations by known electrolytic processes. Upon completion of the contacting with respect to the perforations and conductor tracks, such tracks and associated connections may be provided with a corrosion-inhibiting metal plating, as for example tin, nickel, silver or gold.

The advantage of a structure constructed in accordance with the invention resides in the fact that only a single surface contact is employed in lieu of three surface contacts heretofore required according to the prior art. The conductive intermediate layers required in constructions in accordance with the prior art may thereby be eliminated with a reduction in the difference in potential between the metal coating, for example of copper, and the externally applied metal plates, for example of aluminum. Consequently, the number of individual plates required in a microwave circuit is reduced from four to two, with a considerable reduction in the total weight of the finished structure as well as some reduction in physical dimensions.

Having thus described our invention, it will be obvious to those skilled in the art from the disclosure herein given that various immaterial modifications may be made in the same without departing from the spirit of our invention, hence we do not wish to be understood as limiting ourselves to the exact form, arrangement and combination of parts herein shown and described or uses mentioned.

We claim:

1. A microwave circuit embodying multiplate technique, comprising a pair of relatively thick metal plates, a firmly adhering dielectric coating disposed on one face of each plate, each of which plates forms the supporting member for the associated dielectric coating, said dielectric coatings each being relatively thin as compared with the associated metal plate, microwave circuit elements, in the form of metallic conductor elements disposed on the exposed face of each dielectric coating, said metal plates being arranged in opposed relation with said conductor elements disposed therebetween in engagement with each other, the respective metal plates and associated dielectric coatings having openings therein, and a metallized conductive coating disposed on the walls of said openings and spanning said thin dielectric coating, to provide respective conductive paths between selected conductor elements at the respective openings and the associated metal plate.

2. A microwave circuit according to claim 1, wherein said plates are of aluminum.

3. A microwave circuit according to claim 1, wherein said metallized conductive paths each consist of a plurality of metallic layers.

4. A microwave circuit according to claim 1, wherein said metallized conductive paths and said conductor elements are provided with a protective metal layer selected from a class consisting of tin, nickel, silver or gold.

5. A microwave element according to claim 1, wherein said metallized conductive paths are disposed upon a coating of a material which will provide good adhesion of said metallized conductive paths.

6. A microwave circuit according to claim 5, wherein said plates are constructed of aluminum, said conductor tracks of copper, and said adhesive-promoting material is selected from a class consisting of zincate, nickel and stannate.

7. A microwave circuit according to claim 6, wherein said metallized conductive paths and said conductor elements are provided with a protective metal layer selected from a class consisting of tin, nickel, silver or gold.